United States Patent
Weilant

(10) Patent No.: US 6,830,142 B2
(45) Date of Patent: Dec. 14, 2004

(54) POWER SPLITTING TRANSFER CASES FOR CHANGING VEHICLE TRACTION DRIVES

(75) Inventor: David Robert Weilant, Muncie, IN (US)

(73) Assignee: Borgwarner, Inc., Auburn Hills, MI (US)

( * ) Notice: Subject to any disclaimer, the term of this patent is extended or adjusted under 35 U.S.C. 154(b) by 0 days.

(21) Appl. No.: 10/324,238

(22) Filed: Dec. 19, 2002

(65) Prior Publication Data

US 2004/0118233 A1 Jun. 24, 2004

(51) Int. Cl.⁷ .............................................. F16D 19/00
(52) U.S. Cl. ................................ 192/84.92; 192/69.91; 192/69.7; 180/247
(58) Field of Search ....................... 180/247; 192/84.92, 192/69.7, 69.91

(56) References Cited

U.S. PATENT DOCUMENTS

| | | | |
|---|---|---|---|
| 1,831,955 A | 11/1931 | Harney | |
| 2,893,256 A | 7/1959 | Wargo | |
| 2,906,383 A | 9/1959 | Gabriel | |
| 2,946,238 A | 7/1960 | Beyerstedt | |
| 2,962,139 A | * 11/1960 | Straub ..................... | 192/84.92 |
| 2,969,134 A | 1/1961 | Wiedmann et al. | |
| 3,504,776 A | * 4/1970 | Misenti .................... | 192/84.92 |
| 3,910,131 A | 10/1975 | Richards | |
| 4,381,828 A | 5/1983 | Lunn et al. | |
| 4,407,387 A | 10/1983 | Lindbert | |
| 4,506,773 A | * 3/1985 | Schott ....................... | 180/247 |
| 4,542,801 A | 9/1985 | Richards et al. | |
| 4,586,592 A | * 5/1986 | Mori ........................ | 192/69.91 |
| 4,632,207 A | 12/1986 | Moore | |
| 4,648,492 A | 3/1987 | Moore | |
| 4,997,072 A | 3/1991 | Lapthorne | |
| 5,045,036 A | * 9/1991 | Reuter et al. ............ | 192/84.92 |
| 5,107,972 A | 4/1992 | Sundquist | |
| 5,332,060 A | 7/1994 | Sperduti et al. | |
| 5,407,024 A | 4/1995 | Watson et al. | |
| 5,520,272 A | 5/1996 | Ewer et al. | |
| 5,643,129 A | 7/1997 | Richardson | |
| 5,667,330 A | 9/1997 | Henkel et al. | |

OTHER PUBLICATIONS

4 Speed Gearbox, pp. 1–7, www.web–masters.com/gms/4sp_trans.html.

* cited by examiner

*Primary Examiner*—Charles A. Marmor
*Assistant Examiner*—Dennis J. Abdelnour
(74) *Attorney, Agent, or Firm*—Reising, Ethington, Barnes, Kisselle, P.C.; Greg Dziegielewski

(57) ABSTRACT

A transfer case for a vehicle having two-wheel drive and four-wheel drive operating modes operatively established by a drive transfer mechanism that is selectively employed to interconnect a main power drive shaft construction for the drive of a first set of wheels with an auxiliary drive shaft for the drive of a second set of wheels. The drive transfer mechanism includes a clutch assembly package comprising a control rod supported for movement in a direction coaxial to the longitudinal axis of the auxiliary drive shaft. The clutch assembly includes a clutch collar supported within the auxiliary drive shaft on the control rod for movement therewith to alternately connect and disconnect the power shaft with the auxiliary drive shaft. For multi-ratio case operation, the power shaft construction may have an input and output power shaft sections that are selectively interconnected by a planetary gear set and a speed shift collar. The shift collar is shifted by a second actuator that includes a second control rod supported for rectilinear movement along a longitudinal axis may be parallel to the longitudinal axis of the auxiliary drive shaft. The second control rod moves in response to an input shifting force to effect corresponding movement of a shift fork supported thereon to alternatively interconnect the input power shaft section directly to the output power shaft section via the speed shift collar for high speed operation and indirectly via the planetary gear set and the speed shift collar for low speed operation.

13 Claims, 8 Drawing Sheets

POWER SPLITTING TRANSFER CASES FOR CHANGING VEHICLE TRACTION DRIVES

This invention relates generally to transfer cases for selectively routing drive torque to different sets of traction wheels of vehicles and more particularly to new and improved compact transfer cases featuring innovative lock-up shift collar and rod arrangements operatively connected to external actuators selectively controlled by the vehicle operator for selective shifting between the sets of traction wheels.

BACKGROUND OF THE INVENTION

For enhancing mobility and traction of wheeled vehicles, drive torque transfer cases have been employed for shifting drives between various sets of drive wheels, such as between two-wheel drive and four-wheel drive. Those transfer cases frequently comprise a main power shaft for driving a first set of two traction wheels for two-wheel drive and an auxiliary power shaft selectively conditionable for driving a second set of two traction wheels and establishing four-wheel drive. The auxiliary output shaft is commonly driven via a chain belt extending around drive and driven sprockets respectively mounted on the power and auxiliary shafts. To shift from two-wheel to four-wheel drive, a clutch collar is shifted axially from a disengaged position on the main power shaft where the drive sprockets rotate with respect to the main power shaft to an engaged position where the drive sprocket is fixed to and is rotationally driven by the main power shaft. When this occurs, drive torque is split between the full-time drive wheels and the auxiliary drive wheels so that the shift to four-wheel drive is complete. The shift mechanism for the clutch collar typically comprises a shift fork that has a yoke at an inboard end that operatively fits into a groove of the clutch collar and a connector at the outboard end attached to a shift rod so that axial movement of the shift rod can axially move the shift fork and clutch collar. The shift rod and the associated fork may be shifted by the vehicle operator manually through a lever and linkage system or by power assist fluid or electric motor power units. Examples of such systems and units are disclosed in U.S. Pat. No. 2,887,201 granted May 19, 1959 to Delbert Elwood Willis and U.S. Pat. No. 4,381,828 granted May 3, 1983 to Poyston C. Lunn et al.

However, such shift fork, shift rod and rod actuator arrangements are bulky, space-consuming constructions that require large case housings, and are not practical for many current or forthcoming vehicles, particularly those that have crowded or limited space and require small and narrow case housings. New and improved compact transfer cases with advanced traction drive selection constructions meeting higher operating and spatial efficiency standards are accordingly needed for such vehicles.

SUMMARY OF THE INVENTION

This invention meets such requirement and standards with the provision of a new and improved compact transfer case, which is mechanically and spatially efficient and suitable for numerous current and advanced vehicle designs. The transfer case of this invention advantageously incorporates advanced transmission components and features and meritoriously combines them with new and improved constructions to provide at least first and second power path operating modes for selecting and delivering torque to the diverse sets of traction wheels of a vehicle. A special main power shaft unit is utilized for the full time drive for a first set of drive wheels while an auxiliary drive is employed for the selective drive of a second set of drive wheels. This auxiliary drive incorporates new and improved shifting components that are encapsulated and telescopically packaged and arranged so that space is more effectively utilized and the casing profile is optimized.

More particularly, the drive selection construction of the transfer case of this invention embraces an advanced telescoping clutching unit comprising a torque-transmitting clutch collar and an associated shifter rod or rod, normally blocked out by new and improved blocker spring construction acting on the rod. This shifter rod construction is axially displaced or actuated by a compact and straightforward drive transfer mechanism for operatively connecting and disconnecting the main and the auxiliary drive shafts with respect to one another. The clutch collar actuator includes a shift rod supported for rectilinear movement in a direction coaxial to the longitudinal axis of one of the drive shafts in response to an axial input force for selection of the various traction drives of the transfer case. Preferably, the shift rod is supported for limited telescoping movement with respect to the auxiliary drive shaft. The auxiliary drive shaft is supported by and is adapted to be drivingly connected to a rotary output sprocket or drive transfer output member by the rotatable torque-transmitting clutch collar operatively mounted internally in these components.

The shift rod preferably extends axially through a bore of the output sprocket and telescopes in an aligned bore of the auxiliary drive shaft to enhance the compactness of this space saver construction. The rotatable clutch collar is carried on the shift rod and axially slides within the aligned bore of the auxiliary drive shaft when the rod is axially shifted. The shift rod has an outboard end extending from the housing of the case into operative communication with external shift actuator construction operable to apply an axial force to the shift rod to effect clutch collar shifting and traction selection. Splined sections of the clutch collar and the output sprocket are selectively interconnected to effect the traction drive to a second set of drive wheels. This invention can be readily extended to provide a two speed in the main power shaft of the transfer case, an additional drive for power take-off, and multiple clutching units providing a package which can be effectively utilized for vehicle towing.

DETAILED DESCRIPTION OF THE PREFERRED EMBODIMENTS

Figure 1:
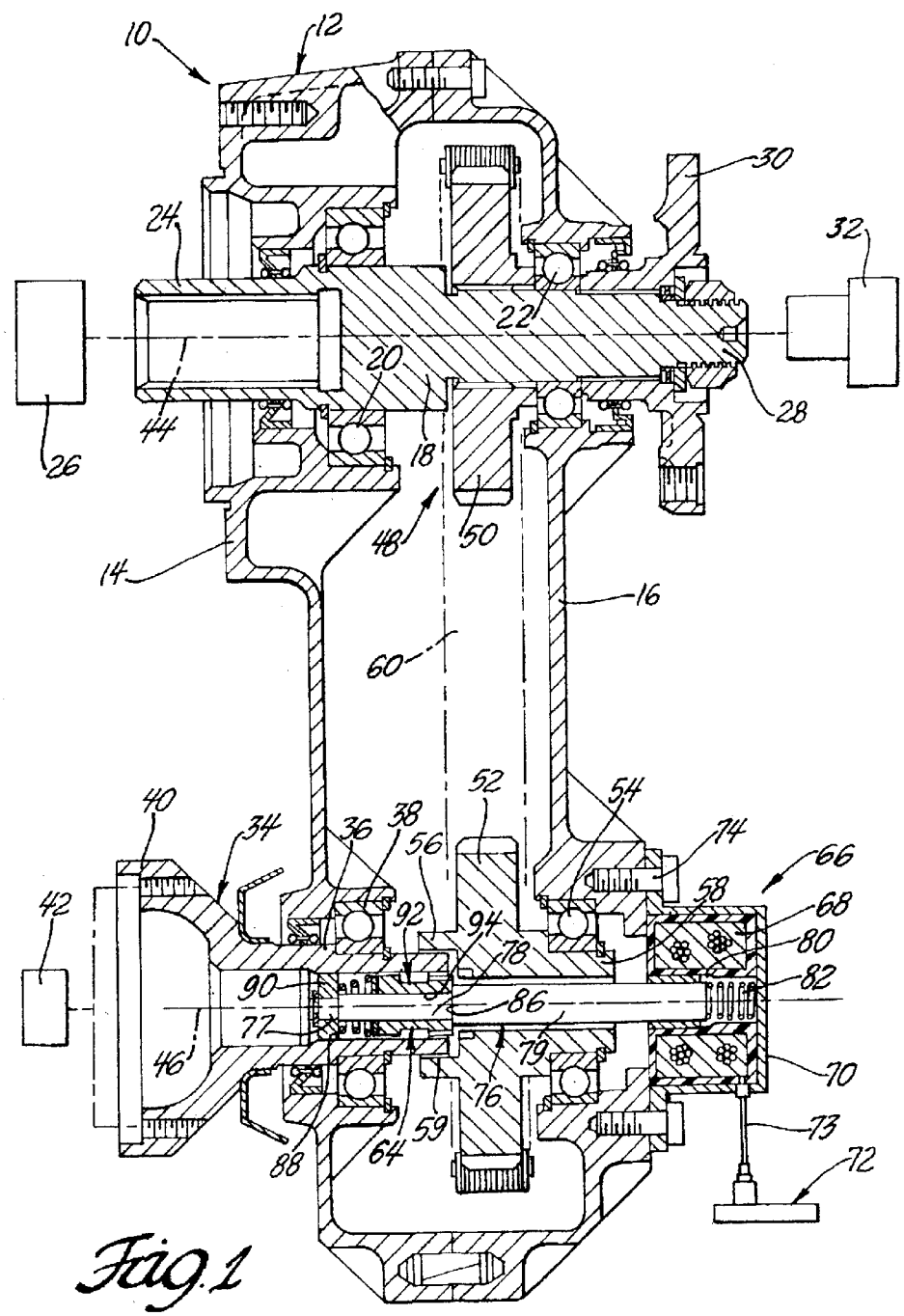
FIG. 1 is a longitudinal section of a power transfer case for automotive vehicles having a drive transfer mechanism in accordance with this invention for shifting between two-wheel and four-wheel drive modes of operation.

Referring now to the drawing and more particularly to FIG. 1, there is shown a transfer case 10 for an automotive vehicle configured to have two and four-wheel drive modes of operation. The transfer case comprises a housing 12 with housing parts 14 and 16 that are bolted together to provide a sealed power dividing unit for the vehicle having conventional front and rear sets of traction wheels. A main drive or power shaft 18 extends through the housing and is mounted for rotation therein by laterally spaced bearings 20 and 22 that are seated in the upper end of housing 12.

The main drive shaft 18 has an input end 24 that is hollow and internally splined or otherwise adapted to be driven by the vehicle engine through an output shaft of an associated automatic or manual change ratio transmission diagrammatically illustrated by the block 26. The drive shaft 18 has an output end 28 splined to an external drive member 30 that is adapted to drive a propeller shaft via a universal joint or other suitable connector. The propeller shaft typically drives the rear set of drive wheels of the vehicle through a conventional differential. These components are diagrammatically shown only in a block configuration identified by reference numeral 32.

In addition to the main driving shaft 18, the transfer case 10 has an auxiliary drive shaft 34 that is offset from and parallel to the main drive shaft and has a shortened cylindrical body 36 externally step shouldered to accommodate the inner race of a bearing 38. The bearing 38 rotatably mounts the auxiliary shaft 34 for rotation in the lower part of the transfer case housing 12. The auxiliary shaft has an external output end 40 configured as a yoke of a universal joint adapted to drive a second propeller shaft which drives a second set of drive wheels typically provided by the front wheels of the automobile and diagrammatically illustrated by the block 42. Power shaft 18 and auxiliary drive shaft 34 are mounted for rotation about parallel longitudinal axes 44 and 46, respectively.

Auxiliary drive shaft 34 is selectively driven by main power shaft 18 via a drive transfer mechanism 48 of the transfer case that is selectively conditionable to drivingly interconnect the shafts 18 and 34 in shifting from two-wheel to four-wheel drive. Drive transfer mechanism 48 includes an input or drive member such as sprocket 50 that is splined or otherwise fixed at a predetermined location on the power shaft 18. The drive transfer mechanism further comprises rotary output or driven sprocket 52 that is rotatably mounted in the lower portion of housing 12 by a ball bearing unit 54. The output sprocket 52 can be selectively connected to the auxiliary shaft 34 by a special internal clutch unit 64 to effect the drive of the second set of drive wheels 42 such as the front wheel of a vehicle for establishing a four-wheel drive mode of operation with two discrete power paths.

More particularly, the output sprocket 52 has coaxial forward and rearward, cylindrical neck portions 56 and 58 that extend axially and concentrically about axis 46. The forward neck portion 56 of the sprocket 52 respectively mounts by suitable annular bearing 59 to the cylindrical inboard end of the auxiliary drive shaft 34. The rearward neck portion 58 is shouldered and mounts to the inner race of the ball bearing unit 54 that is secured in the lower part of housing 12. The drive transfer mechanism further incorporated a chain link drive belt 60 that drivingly connects the driving and driven sprockets 50 and 52. With this construction, the output sprocket 52 is rotatably driven whenever the main power shaft 18 and fixed input sprocket 50 are driven.

Drive transfer mechanism 48 can be considered as including the clutch unit 64 to drivingly connect and disconnect the output drive sprocket 52 with respect to the auxiliary shaft 34 for shifts between four and two-wheel drives. The drive transfer mechanism 48 is activated by an associated external actuator 66 to selectively and drivingly interconnect the main shaft 18 and the auxiliary shaft 34. The actuator 66 in the embodiment of FIG. 1 is an electrically energizable solenoid 68 operatively mounted within a housing 70 which is controlled by a drive selector unit 72 operatively connected to the solenoid 68 by circuit 73. The solenoid housing 70 is attached by threaded fasteners 74 to the transfer case housing so that the solenoid is in operative alignment with an elongated, axially-displaceable shift rod 76 of ferromagnetic material. The shift rod 76 is a unitized stepped diameter cylindrical member that transversely extends along horizontal axis 46 and comprises a small diameter inboard end portion 77, an intermediate diameter portion 78 and a large diameter portion 79. The rod extends through housing 12 and the large diameter portion 79 projects into the hollow core 80 of the externally mounted solenoid and terminates in a flattened end that seats on a suitable wear plate or directly on the inner end of the helical spring 82 extending in the solenoid core. The spring 82 is in turn seated against the inner wall of the housing 70. Spring 82 is a yieldable, shift-blocker that provides a spring force to urge and yieldably hold the shift rod 76 in the blocked position shown in FIG. 1.

The large diameter portion of the shift rod 76 extends axially in housing 12 from contact with the end of helical spring 82 through an axial bore 84 in the output sprocket 52. The rod is stepped in diameter to form a stop shoulder 86 and further extends as the intermediate portion 78 into the aligned axial bore 88 formed in the auxiliary drive shaft 34. A piston-like head 90 is attached to the small diameter portion 77 forming the end most extension of shift rod 76 by a snap ring or other suitable retainer. The head 90 is sized to axially slide in bore 88 when the rod 76 is shifted and provides a sliding inboard end support for the shift rod 76.

Clutch unit 64 comprises a clutch or shift collar 92 that can be shifted in bore 88 of the auxiliary drive shaft and is operatively mounted for torque-transmitting rotation on the intermediate diameter portion 78 of the shift rod. The intermediate portion extends from the small diameter portion 78 of the rod to the stop shoulder 86 dividing the intermediate and large diameter portion of the shift rod.

The clutch or shift collar 92 is a spool-like element with a central bore 94 that is capable of rotating and limited sliding movement on the intermediate portion 78 of the rod. The clutch collar 92 has large diameter cylindrical heads 100 and 102 at opposite ends under the force of a spiral spring as later described. Head 100 is formed with external splines 104 that drivingly mesh with internal splines 106 formed internally in the inboard end of the auxiliary drive shaft 34 so that these two drive elements are always connected. This splined construction also provides a sliding drive connection so that when the clutch collar is shifted from the FIG. 1 position to the right, the external splines thereof mesh with corresponding internal splines 108 formed in the output sprocket 52 to selectively complete the torque transmission drive. A spiral spring 110 of progressively increasing radii is operatively mounted between the head 90 of the shift rod and the head 100 of the shift collar 92 to yieldably urge the head 100 of the shift collar against the stop shoulder 86.

Figure 2:
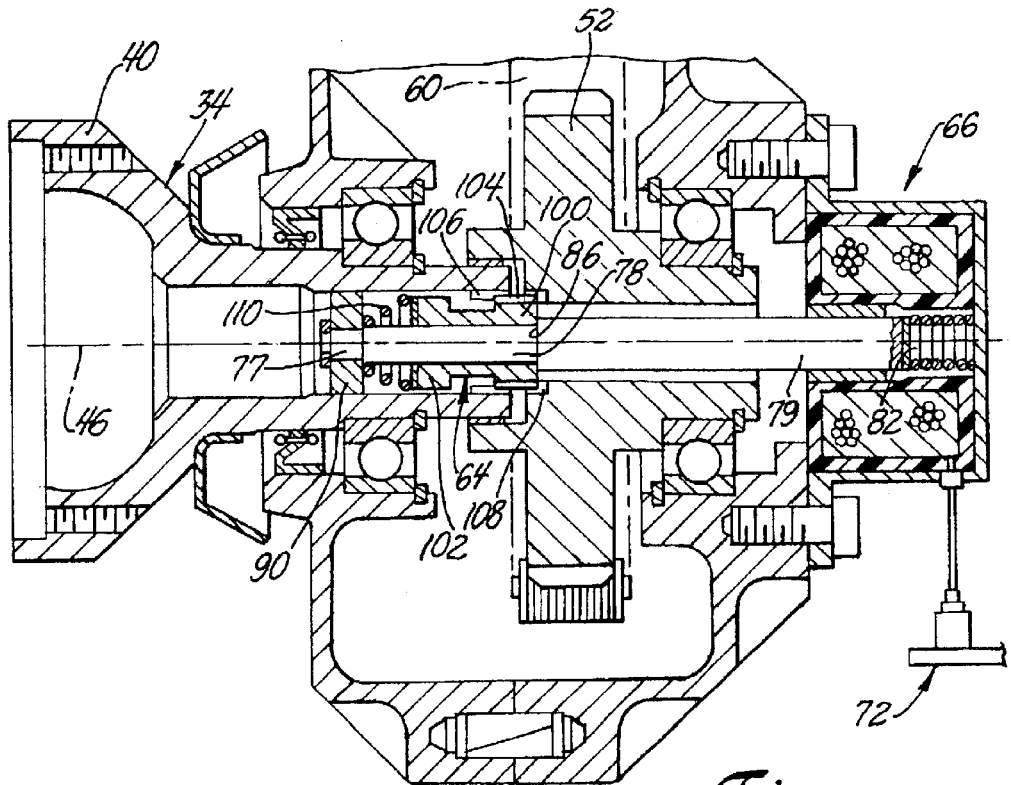
FIG. 2 is a longitudinal sectional view of a portion of the transfer case of FIG. 1 showing the drive transfer mechanism thereof displaced from the FIG. 1 position.
Figure 2A:
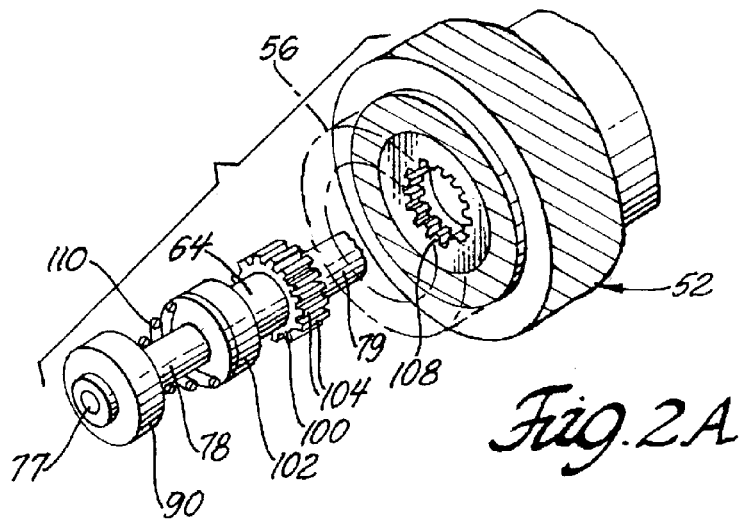
FIG. 2a is a pictorial view of some of the drive transfer elements of FIGS. 1 and 2.

The clutch or shift collar 92 is operatively disposed within the cylindrical bore 88 of the auxiliary drive shaft 34 and more particularly is capable of being stroked by the shift rod 76 from the spring-blocked or drive-disconnected position of FIG. 1 into the drive engaged or drive connect position of FIG. 2.

For shifts from two-wheel to four-wheel drive, the clutch collar 92 can be readily shifted by the operator who effects movement of the rod and into the splined drive position of FIG. 2 on the selective energization of the solenoid. The energized solenoid generates a field which exerts an axial pulling force on the outboard end portion of the shift rod 76 and effects rod displacement to the right in FIG. 1. On such displacement of the rod, a drive shifting force is applied to the clutch or shift collar 92 via head 90 of the shift rod and the intervening spiral spring 110 whose rate is such that it yields under load. With this construction, there is some limited relative sliding movement between the shift collar and the intermediate section of the shift rod. In any event, the clutching collar is displaced to the FIG. 2 position in which the splines on the cylindrical head of the collar drivingly mesh with the splines 108 formed in the counter bore of the sprocket 52. To cushion and augment this action the shift collar may turn on the intermediate portion of the rod and the spring 110 may yield to enable the splines to smoothly intermesh. Under these conditions, the torque subsequently applied to the driven sprocket is transmitted by the rotating collar through the intermeshing splines to the auxiliary drive shaft 34 and the set of front drive wheels 42 thereby effecting four-wheel drive.

To return to two-wheel drive the vehicle may be driven at low torque conditions or the transmissions may be placed in neutral and the solenoid deenergized. Under such conditions, spring 82 strokes shift rod and the shift collar to the left from the FIG. 2 position and back to the spring blocked FIG. 1 position for two-wheel drive.

Figure 3:
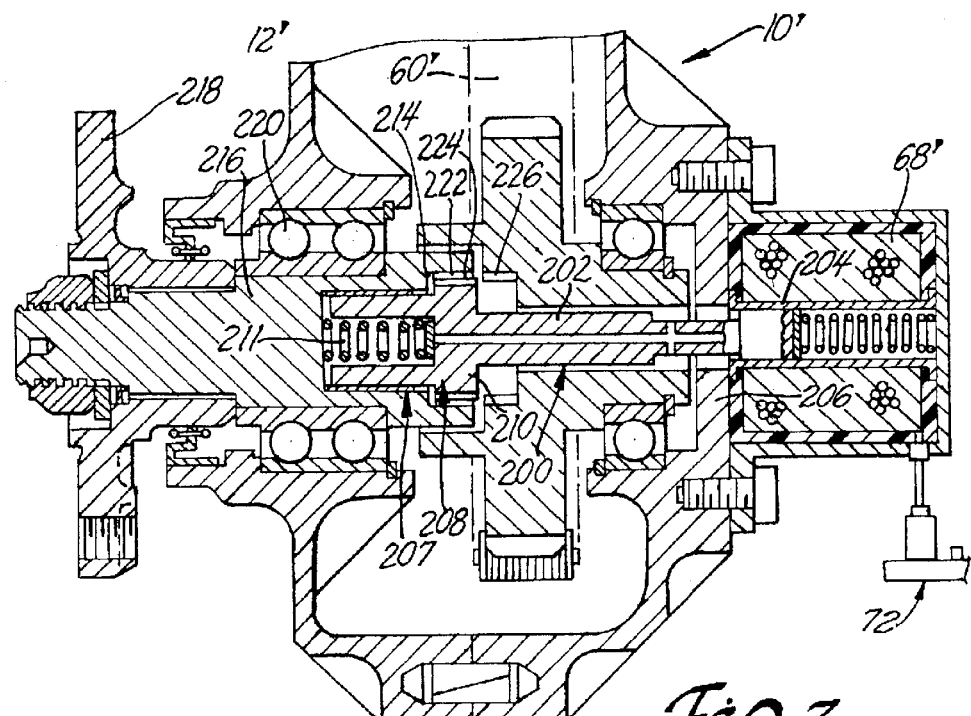
FIG. 3 is a view similar to the view of FIG. 2 illustrating a modification of the drive transfer mechanism for shifting between various modes of operation.

This invention can be somewhat simplified in construction in the clutching unit with the clutch or shift collar thereof being integrated with the shift rod as shown in FIG. 3 instead of being the separately formed elements of the construction of FIG. 1. Some of the elements in the FIG. 3 construction corresponding to the same elements of FIG. 1 are denoted by the same reference numeral but which has been differentiated by a prime character. Only the lower or axially drive components of the embodiments have been shown in FIG. 3 since the remainder or primary drive components are the same as those shown in FIG. 1.

The integrated construction of FIG. 3 includes a ferromagnetic shift rod unit 200 comprising an elongated, generally-cylindrical shaft portion 202 that extends for axial sliding movement from the interior or core of the solenoid 68' through an annular bushing 204 in a flattened wall portion 206 of the transfer case housing. Shaft portion 202 contains porting to vent oil or air to prevent air lock (suction) or pressure build-up. Furthermore, the clutching unit 207 is compacted and simplified with the inboard end of the shift rod unit integrally formed with an enlarged cylindrical clutch or shift collar portion 208 that has a larger diameter cylindrical head 210. The shift collar 208 is axially bored to receive helical spring 211 that acts counter to the larger force of spring 82' to yieldably maintain the shirt rod in the FIG. 2 blocked position. The head 210 is sited generally at the juncture thereof with the elongated shaft portion 202. The clutch or shift collar portion 208 of the clutching unit 207 is configured to have limited sliding motion in the axial opening formed by the bore and counter bore 214 in the axially extending output shaft 216. The output shaft 216 has an output flange 218 splined thereto that is connected to a drive that includes a differential operatively connected to the front wheel of the vehicle, not shown. The output shaft 216 is mounted by ball bearing unit 220 for rotation in the housing 12' of the transfer case 10'. As in the previous embodiment a sliding, torque-transmitting connection is provided by the internal splines 222 of the inner annular wall of the counter bore of the output shaft 216 and the meshing splines 224 of the outer circumference of the cylindrical head 210 of the clutch collar portion 208. When the shift rod and its integral shift body portion are pulled to the right by the field forces of the electrically energized solenoid 68' against the opposing spring force of helical spring 82', the splines 224 of the head of the shift body portion will be moved into meshing engagement with the internal splines 226 of the output or driven sprocket 52'. With this meshing, the shift rod and shift collar are rotatably driven and transmit drive torque to the auxiliary drive shaft. Torque is accordingly split with supplemental drive established to the front wheels of the vehicle for four-wheel drive. As pointed out above, drive to the rear wheels is the same as that of FIG. 1 and the description of that embodiment may be referenced in connection with this embodiment.

Moreover, two-wheel drive may be readily re-established by the vehicle operator such as by conditioning the transfer case for two-wheel drive by the appropriate operation of controls 72' effecting the intentional de-energizing of the solenoid. With the reduction or elimination of drive torque through the clutch collar and with the deletion of the magnetic field, helical spring 82' is operative to overcome the opposing force of lower rate spring 211 to return the shift rod and integral clutch collar to the spring blocked position of FIG. 3. In that position and with the transmission in drive, the vehicle drive is routed solely to the rear drive wheels.

Figure 4:
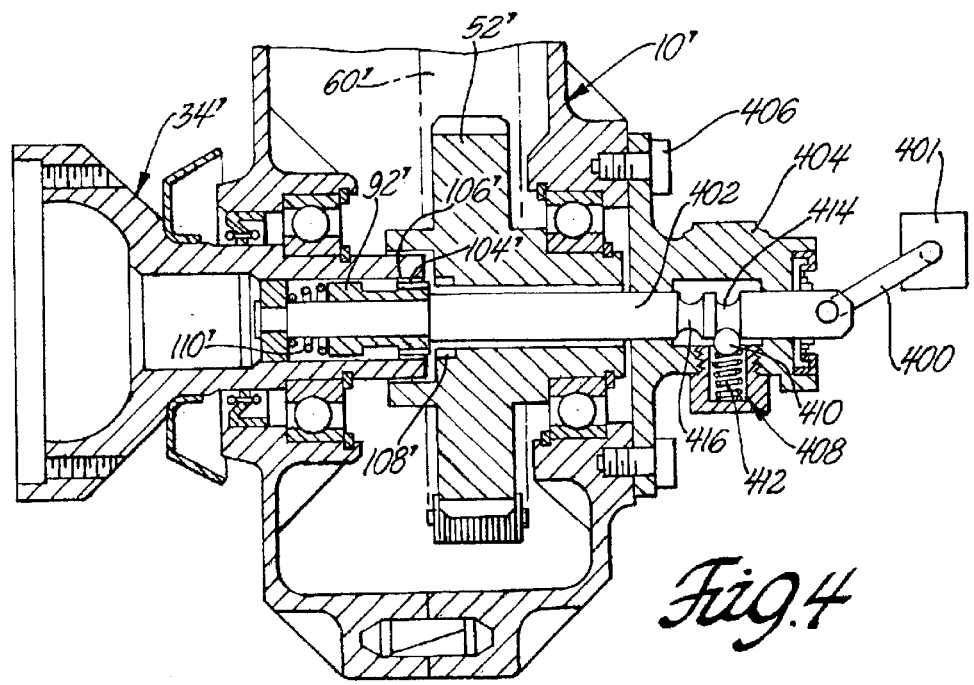
FIG. 4 is a view similar to the views of FIGS. 2 and 3 illustrating a manual system for operating the drive transfer mechanism of FIG. 1.

Turning now to FIG. 4 there is illustrated another variation of this invention differing from FIGS. 1–3 constructions by the elimination of the solenoid and the controls therefore and by the modification of the shift rod for actuation by the vehicle operator through a mechanical linkage system diagrammatically identified as linkage 400 and actuator 401. Components referenced in FIG. 4 that are substantially the same as corresponding parts of previous constructions are generally identified with the same reference numerals that have been primed. As in the construction of FIG. 3, the rear wheel drive components and the drive sprocket construction comprising the upper part of the transfer case for rear wheel drive are not illustrated in FIG. 4 since they are the same as the FIG. 1 embodiment and reference can be made to FIG. 1 for the description for FIG. 4.

More particularly in the FIG. 4 construction, the cylindrical shift rod 402 has been extended in length to project out of the transfer case 10' and through a flanged rod guide 404. The rod guide is attached by threaded fasteners 406 that extend through the radial flange thereof into threaded connection with the housing of the transfer case 10'. A rod guide detent 408 comprises a ball 410 that is biased by a helical spring 412 in a radial direction to engage either annular groove 414 or 416 formed in predetermined spaced locations along the length of the shift rod to releasably hold the shift rod either in the illustrated two-wheel drive position or a displaced four-wheel drive position as will be described.

In the event that four-wheel drive is necessary or desired, the vehicle operator mechanically or otherwise operates the linkage system 400 to pull the shift rod to the right against the retarding force exerted by the spring of the ball detent. The shift rod acting through spiral spring 110' urges the rotatable shift or clutch collar 92' to the right so that the splines of the clutch collar mesh with the internal splines of the sprocket 52' as in the previous embodiment. Under these conditions, power can flow through the splined interconnection between the sprocket 52' and the auxiliary drives 34' for the drive of the front wheels of the vehicle. Since the rear wheels are driven as in the previous embodiments, four-wheel drive is accomplished for the improved handling and traction of the vehicle.

When the two-wheel drive is again desired, torque transmittal through the splined position of FIG. 4 by mechanical operation of linkage system. With the splines disengaged and with the transfer case receiving drive torque from the transmission, all power flow through the transfer case will be routed to the rear wheels of the vehicle for two-wheel drive as in the FIG. 1 embodiment.

Figure 5:
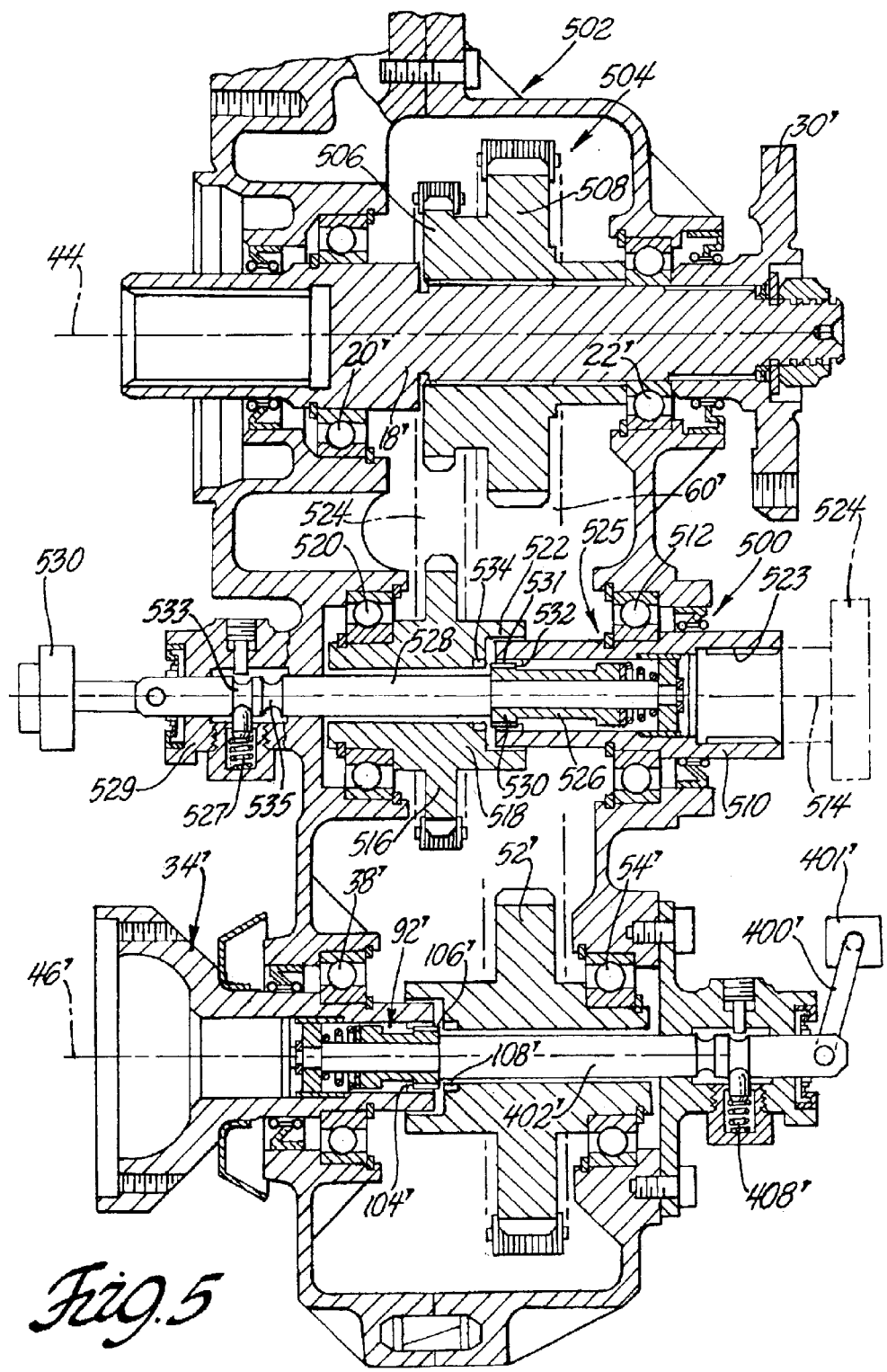
FIG. 5 is a longitudinal sectional view of another transfer case of the invention having a drive transfer mechanism for shifting between two-wheel drive and four-wheel drive modes and an additional drive transfer mechanism for operating a power take-off shaft.

Turning now to FIG. 5 in which the telescoping clutching hub and shift rod construction of this invention can be advantageously employed in different transfer cases with minimal structural changes in the case housing or in the drive components therein. As illustrated in FIG. 5, for example, the invention is carried forward from the construction of FIGS. 1–4 with the unique addition of a power take off unit 500 into the transfer case 502. As with the other constructions, the design of FIG. 5 selectively and effectively provides two-wheel or four-wheel drive. In FIG. 5 an input drive unit 504, comprising a laterally disposed pair of input sprockets 506 and 508 of predetermined small and large diameters respectively, are operatively mounted by a common hub to the input shaft 18'. These sprockets are employed as a double chain drive to transfer torque to first and second nested or telescoping clutch collars, which are selectively engaged for power take-off and for front wheel drive as will be later described.

The input shaft 18' corresponds to the input shaft of FIG. 1 and is rotatably mounted in the housing of the transfer case by ball bearing units 20' and 22' and is also driven by an engine through a change speed transmission. The rotatable shaft 18' extends through the transfer case housing to the output flange 30' for operative connection to a drive line for driving the rear traction wheels of a vehicle through a differential not shown.

The large diameter sprocket 508 is a primary drive element that drives a chain link belt 60' that extends around a driven or output sprocket 52' mounted for rotation in the transfer case by bearing unit 54' for the selective drive of an auxiliary drive shaft 34' that is in turn mounted in the transfer case by bearing unit 38' and is drivingly connected to the front wheels of a vehicle as in the configurations of FIGS. 1–4. The shift rod 402' and rotatable shift collar 92' are the same as that of FIG. 4 and the detailed description and operation thereof is hereby incorporated by reference. Some components common to FIGS. 1–4 have been carried forward into FIG. 5 and where applicable are generally identified with corresponding reference numerals that have been primed.

In general, by manually or otherwise pulling the shift rod 402' to the right from the position shown in FIG. 5 the splines 104', 106' and 108' on the auxiliary drive shaft 34', the clutch collar 92' and the driven sprocket 52' operatively mesh effect a drive connection. This connection is the same as in the previous embodiment, FIG. 2, for example for establishing four-wheel drive operation. To shift back into two-wheel drive, this splined drive will be disconnected by the axial displacement of the shift rod 402' back to the FIG. 5 position where it is yieldably blocked by spring detent 408'. Under such conditions, there is no power flow to the front wheel drive but the rear wheel drive remains as previously described. However, the double chain drive provides important benefits that cannot be readily obtained in the FIGS. 1–4 constructions.

More particularly a selectively driven power take-off 500 involving a third power path is incorporated in the transfer case 502 with the addition of cylindrical power take-off shaft 510. The power take-off shaft mounted by bearing unit 512 in the casing 502 for rotation on axis 514 located between and generally parallel to the main drive shaft 18' and its axis 44' and to the auxiliary drive shaft 34 and its axis 46'. The power take-off comprises a driven sprocket 516 having a generally cylindrical drive hub 518 mounted for rotation in casing 502 around axis 514 by ball bearing unit 520 and by a sleeve bearing 522 operatively disposed between the inner cylindrical wall of the counter bore formed axially in the sprocket hub and the outer cylindrical surface of the power take-off shaft 510. The power take-off shaft is internally splined at 523 in the outboard end thereof for connection to the rotatable drive of an accessory 524 such as a wench or rotary fluid pump. The power take-off can be easily activated by the selectable engagement of an internal clutching unit 525 of this invention by the vehicle operator when desired.

As illustrated in FIG. 5 the clutching unit 525 comprises a spool-like clutching collar 526, which may be substantially identical to the clutch collar 92. This clutching collar is operatively mounted on intermediate diameter portion of a selector shift rod 528 of suitable ferrous material that extends through the transfer case around the central axis 514. The rod 528 is elongated and slidably extends through a sealed rod guide 529 from operative connection with a suitable actuator 530 that is under control of the vehicle operator. A spring biased detent 527 mounted within the rod guide is operatively engagable with either of the laterally spaced grooves 533 and 535 in the rod to yieldably hold the rod in adjusted position for power take-off drive or for release to disengage the power take-off.

The clutching collar 526 as in the other embodiments has laterally spaced and enlarged diameter head portions with the inboard head being provided with external splines 531 that slidably engage the internal splines 532 of the cylindrical output member 510. The shift rod 528 can be displaced to the left in FIG. 5 by operation of actuator 530 so that the shift or clutch collar 526 will be forced to axially move therewith. This causes the external splines thereof to drivingly mesh with the internal splines 534 formed in the cylindrical wall of the axial counter bore on the drive hub 518.

Under such engaged conditions, power is routed to the cylindrical output member 510 for the rotational drive of power take-off shaft 510. The power take-off is released by the movement of the rod back to the FIG. 5 position so that the splines of the shift or clutching collar 526 disengage with respect to the splines of the drive hub.

Figure 5A:
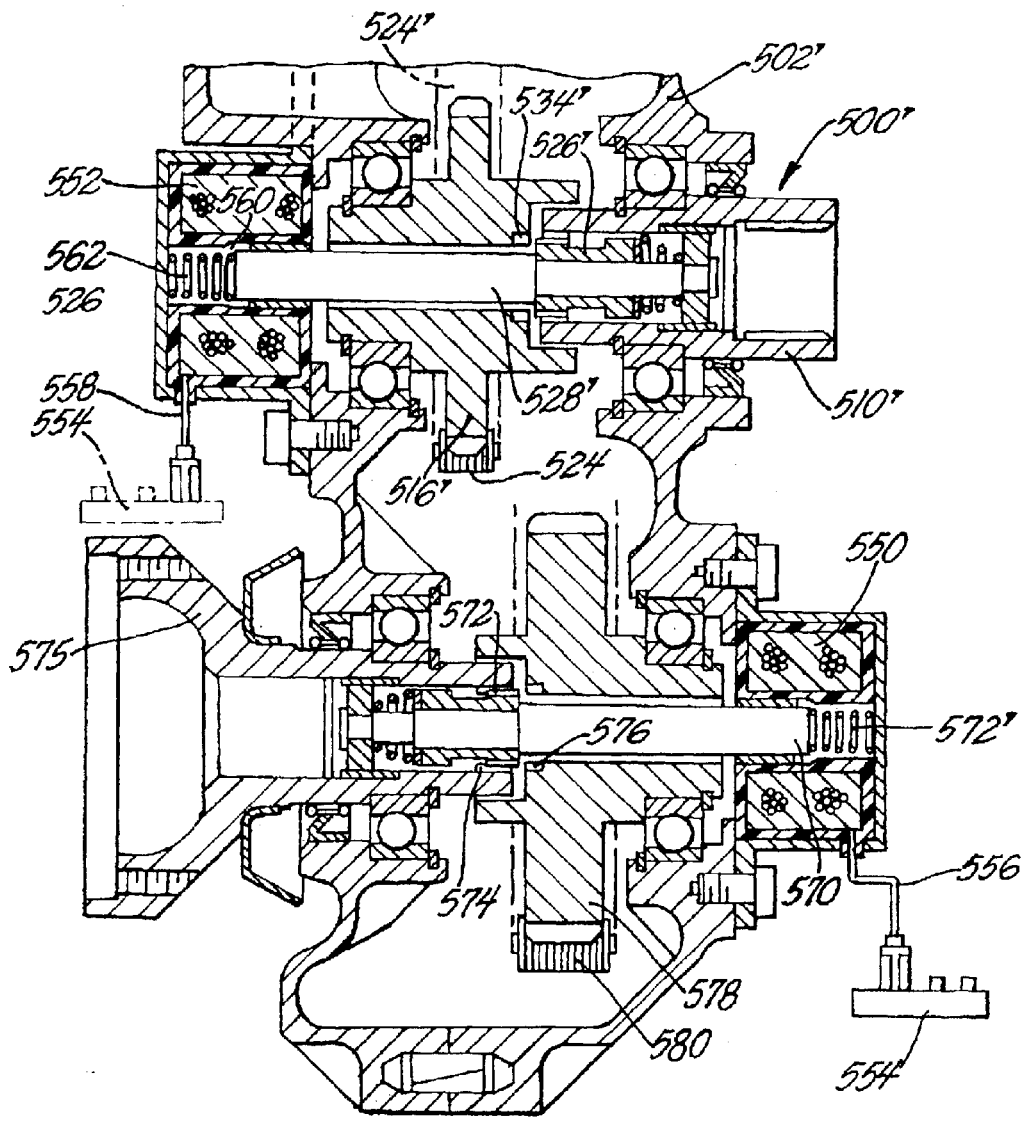
FIG. 5a is a longitudinal sectional view of a lower portion to a transfer case similar to the case of FIG. 5 but illustrating operation thereof by electrically energizable solenoid units.

FIG. 5a illustrates an alternative way of selectively actuating the power take-off and front wheel drive clutch or shift collars of FIG. 5 of this invention by advantageously utilizing a pair of solenoids 550 and 552 operatively connected to controls 554 by circuits 556 and 558. The casing 502', the main drive to the rear wheels, the double sprocket drive for driving the power take-off and the front drive wheels are substantially the same in construction and operation as that of FIG. 5. Moreover, the spline constructions of the shift collars, drive sprockets and their associated outputs are also the same as in FIG. 5 and the pictorial and written descriptions thereof are incorporated by reference into the description of FIG. 5a. The cylindrical shift rod 528' of the power take—off 500' is however foreshortened to slidably fit in the core of the solenoid 552 so that the end thereof contacts the inboard end of helical spring 562 operatively mounted in the core.

Spring 562 normally biases the shift rod 528 and the associated clutch collar 526' to an inactive position in which the drive splines of the collar are displaced from drive engagement with the splines 534' of the power take-off drive sprocket 516' so that there is no power flowing to the output of the power take off. Subsequently, when the solenoid 552 is selectively energized for power take off operation, the rod 528' will be pulled to the left in FIG. 5a to effect the drive engagement of the drive splines of the shift collar 526' with the internal splines 534' of sprocket 516' for the drive connection of the rotating sprocket 516' and the cylindrical output member 510' of the power take-off shaft 500. This splined interconnection completes the power take-off drive.

As pointed out, main power shaft two wheel drive in FIG. 5a is the same in construction and operation as in the embodiment of FIG. 5 so reference can be made thereto for the two wheel drive construction and operation of this embodiment. For four wheel drive the solenoid 550 is selectively energized such as by the vehicle operator through the controls 554. This will displace the ferromagnetic shift rod 570 to the right in FIG. 5a against the action of spring 572 operatively mounted in the core of solenoid 550. With this rod displacement, the external splines 572 of the shift collar mounted on the rod that slidably mesh with the internal splines 574 of the front wheel drive output shaft 575 will also move into meshing engagement with the internal splines of the sprocket 578. Sprocket 578 is in turn driven by an input sprocket such as sprocket 508 of FIG. 5 through a chain belt 580 to effect rotational drive of the shaft 575 for drive of the auxiliary power shaft and the front traction wheels of the vehicle.

Accordingly, with the completion of the splined drive, the front road wheels will be driven as in FIG. 5 for four-wheel drive operation. When solenoid 550 is deenergized spring 572 will again effect disengagement of the front wheel drive shown in FIG. 5a so that two-wheel drive is resumed.

Figure 6:
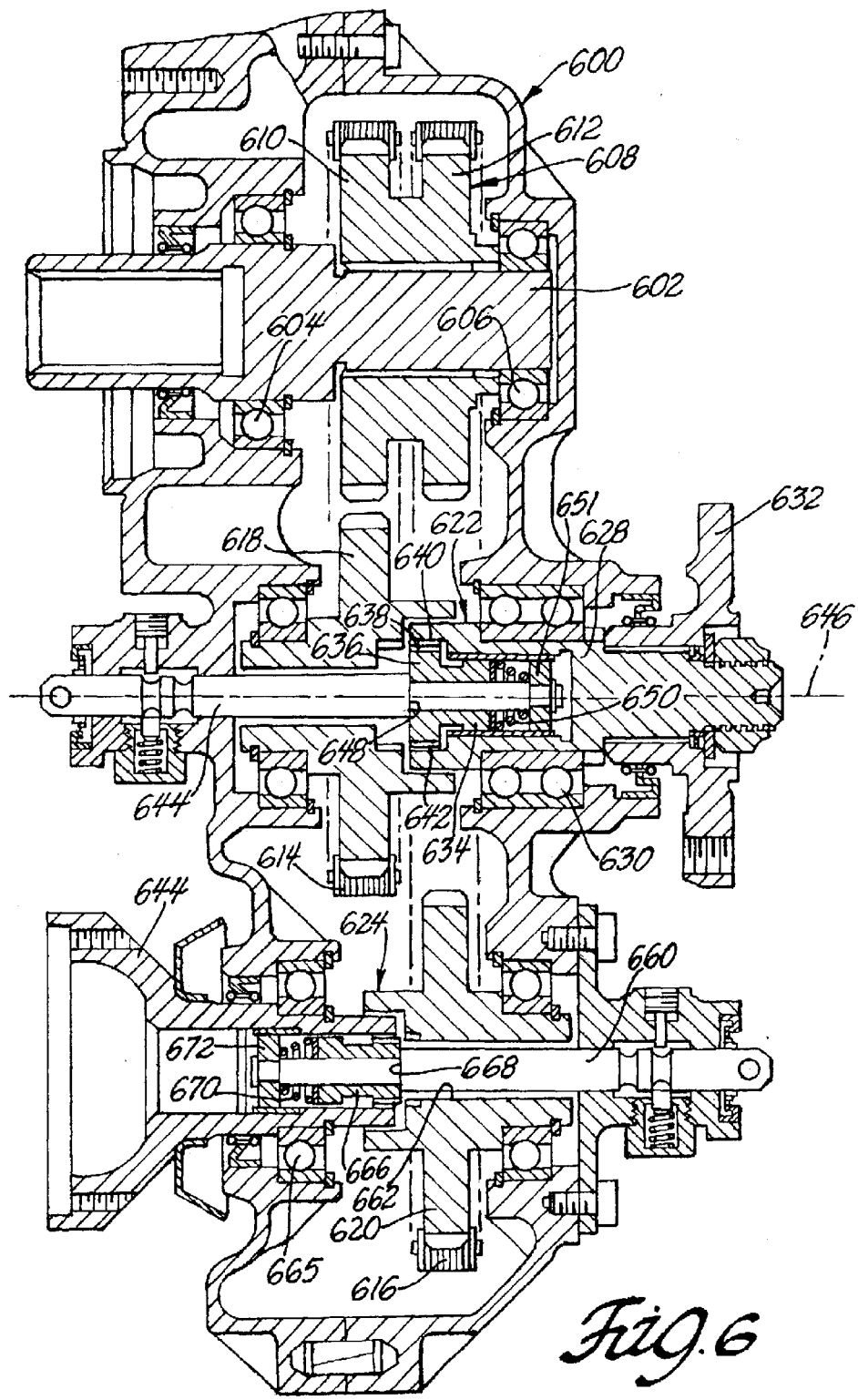
FIG. 6 is a longitudinal sectional view of another transfer case according to this invention.

In many aspects, the transfer case 600 of the FIG. 6 embodiment is similar to the transfer case of the embodiment of FIG. 5 but is distinctively modified to provide for improved vehicle towing. The transfer case 600 has an elongated input drive shaft 602 rotatably mounted in the case housing by ball bearing unit 604 and by ball bearing unit 606 seated in the case 600 and operatively mounted about the outer end of shaft 602. Shaft 602 drives an input sprocket unit 608. This sprocket unit comprises a pair of input sprockets 610 and 612 of predetermined small and large diameters having a common hub splined to the input drive shaft 602. These sprockets are active to respectively drive a pair of endless chains 614 and 616 to loop around and transfer motive power to lower sprockets 618 and 620 for separate inputs to the two telescoping internal clutch units 622 and 624. These clutch units can be selectively engaged by the vehicle operator for either two-wheel or four-wheel vehicle drive. The clutch unit 624 for front wheel drive is the same construction as the clutch unit for the front wheel drive of the constructions of FIGS. 1, 4 and 5. Moreover, the clutch unit 622 is substantially the same as that of FIG. 5 but instead of a power take-off a high-torque drive shaft 628 is employed as an output component for the drive of the rear road wheels of the vehicle.

More particularly, the output shaft 628 is an elongated member that is rotatably mounted in the case 600 by ball bearing unit 630 and projects outwardly thereof and into splined drive connection with a drive plate or flange 632 that in turn is operatively connected to one set of drive wheels of the vehicle such as the rear drive wheels through a conventional drive line including a differential not illustrated.

The inboard end of this output shaft 628 is bored to operatively house a rotatable spool-like clutch collar 634 therein which has a cylindrical head portion 636 with peripheral splines 638 to drivingly and slidably mesh with the radially extending internal splines 640 in the counter bore 642 formed in inner end of the output shaft 628.

A shift rod 644 extends longitudinally in the housing of the transfer case 600 for axial movement along axis 646. The clutch collar is operatively mounted for limited sliding movement and rotation on the reduced-diameter, intermediate-portion of the rod 644 and is yieldably biased against a shoulder 648 on the rod by a spiral spring 650 operatively mounted on the shift rod 644 between the end of the clutch collar and a cylindrical spring seat 651 fixed on the end of the rod.

In construction reflecting that of previous embodiments, the configuration of FIG. 6 incorporates a rear wheel drive and operative selective drive to the front road wheels of the vehicle. This drive includes an elongated cylindrical shift rod 660 operatively mounted in the transfer case 600 that extends though an axial bore 662 in the front wheel drive sprocket 620 and into the aligned bore in the output shaft 664 mounted by ball bearing unit 665 in the housing of the transfer case. As in the previous embodiments, the shaft 664 can be selectively connected to a drive sprocket such as sprocket 620 and has an external output end that is drivingly connected to the front driving wheels of the vehicle. A cylindrical and spool-like clutch collar 666 is operatively mounted on a reduced diameter section of the shift rod and is yieldably held against the large diameter shoulder 668 of the rod by a helical spring 670 that is mounted on the spring seat 672 fixed to the end of the rod. In addition, as in the previous embodiments, the clutch collar has enlarged head ends one end of which is externally splined to slidable mesh with the internal splines of the output shaft. For the selective drive of the output shaft, the rod is manually displaced to the right in FIG. 6 by the vehicle operator so that the splines on the clutch collar will move into meshing engagement with the internal splines provided in the aligned counterbore of the sprocket 660. With this splined connection completed the rotational drive of the output shaft is completed.

The transfer case of FIG. 6 notably provides for improved towing of the vehicle since the two clutch collars 634 and 666 can be readily shifted by the vehicle operator to their neutral positions through appropriate displacement of their control shafts. With such collar positions, there will be no back drive from the vehicle road wheels through the transfer case to the transmission. This sharply reduces or eliminates any undue wear or breakage of the transfer case, transmission or other drive line components such as may otherwise occur from towing. Subsequently when the vehicle is being driven, two-wheel and four-wheel drive of the vehicle can be readily accomplished as described.

Figure 7:
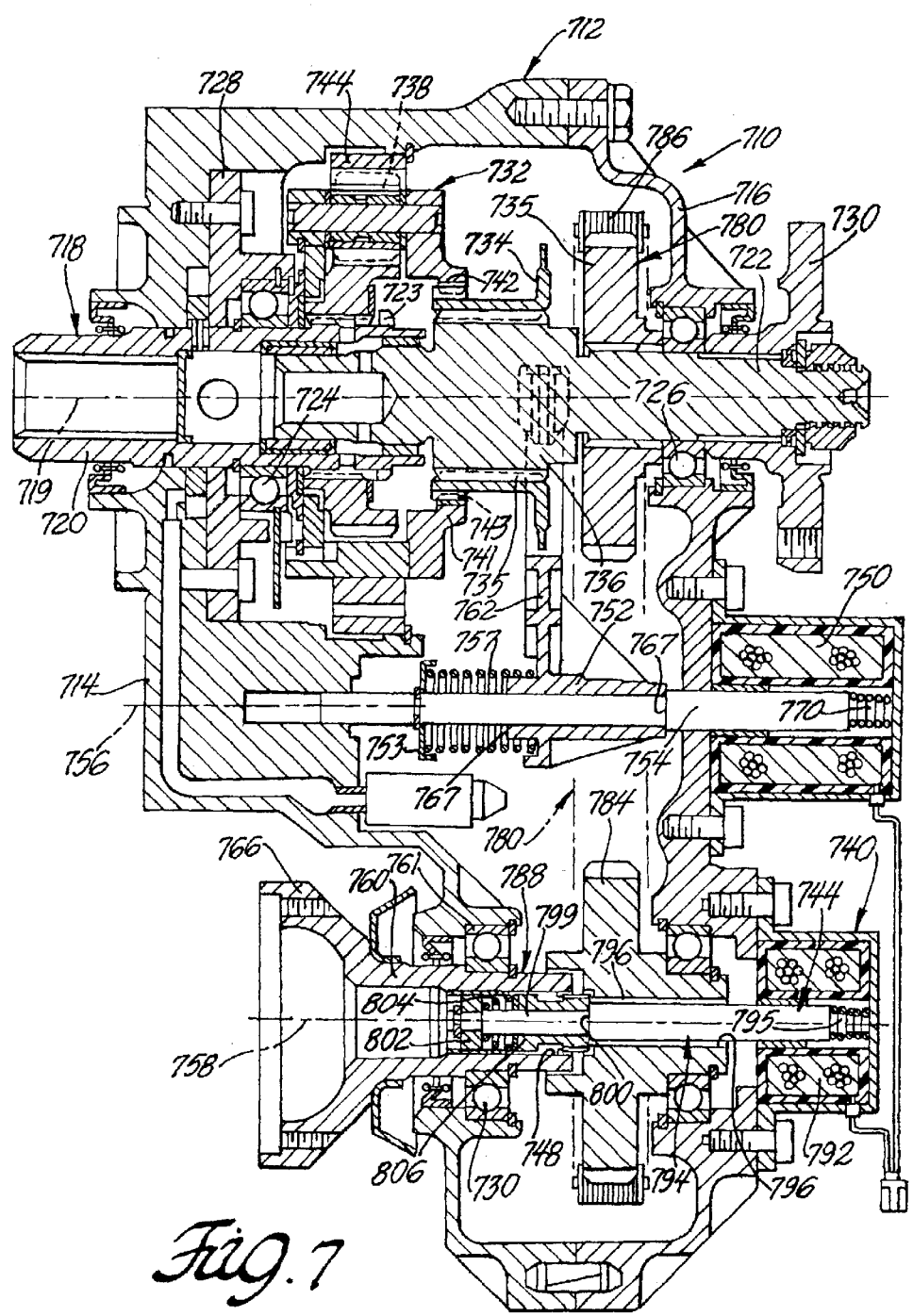
FIG. 7 is a longitudinal section of a two-speed transfer case according to this invention.

Referring now to the transfer case 710 of FIG. 7, the distinctive torque transmitting construction thereof provides the power paths for two and four-wheel drive modes of operation and for multiple input/output drive ratios to improve vehicle operation under increased loads. The transfer case comprises housing 712 with housing parts 714 and 716 joined together by threaded fasteners 717. A main power shaft 718, comprising axially-aligned and relatively-rotatable input and output shaft sections 720 and 722 mounted by ball bearings 724 and 726 within the housing for rotation about axis 719. As illustrated, the inboard end of input shaft section 720 pilots and rotationally supports the inner end 725 of output shaft section 722 extending therein. Drive splines 723 extending radially and outwardly are provided on the end portion of input shaft section 720 for direct drive operation as will be explained later.

The forward ball bearing 724 operatively disposed around input shaft section 720, is secured in the upper end of housing 712 by retainer plate 728 bolted or otherwise securely fastened to the interior of the housing.

The input shaft section 720 of the main power shaft has an input end 729 projecting from the housing around axis 719 that is hollow and internally splined for drive connection to an output shaft of a power transmission (not shown) so that drive torque developed by the vehicle engine can be transmitted by the vehicle transmission into the multi-ratio transfer case 710. The output shaft section 722 of the power shaft extends about axis 719 and out of housing 712 and is externally splined to a drive plate 730. Plate 730 is adapted to drive a propeller shaft via a universal joint yoke or other suitable connector for driving the rear road wheels of the automobile. The input shaft section 720 of the main power shaft 718 may be selectively and drivingly connected to the output power shaft section 722 by a change ratio planetary gear set 732 operatively mounted between these two shaft sections within housing 712. This selective connection is by way of cylindrical shift collar 734 that is internally splined for meshing and for axial shifting movement with respect to the splines of the enlarged cylindrical section 736 of the rotatable output shaft section 722 formed with external splines 735.

The planetary gear set 732 comprises a sun gear 733 having an internal hub operatively connected by meshing splines to an inner end portion of the input power shaft section 720 so that it rotates therewith. The sun gear meshes with planetary pinions 738 that are rotatably mounted on pivots shafts 739 extending from a supporting carrier plate 740. The carrier plate has an axially offset annular hub 741, which has internal splines 742 that operatively mesh with an annular set of peripheral splines 743 extending outwardly from the end of the sleeve or shift collar 734. The planetary gear set 732 further comprises a ring gear 744 held stationary in the housing that has internal gear teeth that mesh with the teeth of the planetary pinions 738. The ring gear being fixed from rotation provides reaction in the gear set for selectively increasing input torque and reducing speed. More particularly with the ring gear held and the sun gear driven by the input shaft section, the planet gears meshing with the ring gear teeth, will rotate and orbit in the ring gear around the sun gear to turn carrier and the connected shaft collar and output shaft section 722 at a torque increasing and speed reducing drive ratio.

As disclosed above, the gear unit 732 is a two speed unit so when increased speed and reduced torque is needed, the sleeve like shift collar 734 is shifted axially to the left from the FIG. 7 position to release the splined drive connection between the carrier and the sleeve and thereby the drive through to planetary gear unit to terminate the reduction drive. When shifted to the far left in FIG. 7, shift collar 734 meshes with the drive splines 723 on the input shaft section to provide a direct drive connection between the input shaft section 720 and the output shaft section 722 to effect an increase in speed and a reduction of torque. More particularly, with the shift collar 734 so displaced the internal splines thereof drivingly mesh with the external splines of both the input and output shaft sections. This establishes a direct drive connection between input and output shafts for the direct drive.

Shift collar 734 is axially shifted by operation of a solenoid or electromagnetic actuator 750 that is operable to selectively generate an electromagnetic force to effect movement of the shift collar 734. To this end a ferrous shift rod 754 which is supported for rectilinear movement along an axis 756 that is midway between and spaced parallel to the longitudinal axis 719 of power shaft 718 and a longitudinal axis 758 of an auxiliary drive shaft 760 operatively mounted in the housing and later described.

A shift fork 762 mounted on ferrous shift rod 754 operatively interconnects the shift collar 734 and the shift rod 754. More particularly, the shift fork has a cylindrical body portion 752 that has an axial bore 755 through which an intermediate diameter portion of the shift rod extends. A large diameter helical spring 757 is mounted on a spring seat 753 fixed at a predetermined point on rod 754. This spring extends around the rod 754 and seats on the end of the cylindrical body portion 752 to yieldably urge the shift fork 762 into engagement with the shoulder 767 of the shift rod 754 to establish an operating position of the shift fork. The shift rod 754 is displaced axially to the right in viewing FIG. 7 in response to the force field of the solenoid 750 when electrically energized by the operator through controls.

The ratio selecting shift collar 734 for the planetary gear unit is operatively connected to the shift fork 762 which is selectively moved to connect (1) the input power shaft section directly with output power shaft section 722 for high speed operation or (2) the input power shaft section with the output power shaft section through the planetary gear set 723 for higher torque, lower speed operation.

When solenoid 750 is de-energized, a helical spring 770 mounted in the hollow center or core of the solenoid and operatively engaging the end of the shift rod urges the shift rod 754 and its shift fork to the left from the FIG. 7 position to axially displace the shift collar 734 to the left to effect the engagement of the internal splines of the shift collar with the direct drive splines 723 of the input shaft section 720. This provides for the direct drive of the drive plate 730 and the rear drive wheels of the vehicle as well as the direct drive of the auxiliary shaft as explained below.

As pointed out, transfer case 710 further incorporates an auxiliary output or drive shaft 760 for vehicle front wheel drive that is mounted by bearing 761 for rotation about axis 758. Auxiliary drive shaft 760 extends through housing part 714 and has an external output end 766 that may be formed as a universal joint bell or otherwise adapted to drive a second propeller shaft that drives the front wheels of the vehicle.

Auxiliary drive shaft 760 is selectively driven by main power shaft 718 at low or high speed ratios via a drive transfer mechanism 780 that is conditionable to drivingly interconnect the main and auxiliary power shafts 718 and 760. Drive transfer mechanism 780 includes a drive sprocket 782 or splined or otherwise fixed on output shaft section 722 of the main power shaft 718. The drive transfer mechanism 780 further includes a rotary output sprocket or member 784 that is rotatably mounted in the transfer case 710 by bearing 781 for the selective rotary drive of the auxiliary drive shaft 760. An endless chain link drive belt 786 drivingly interconnects input sprocket 782 and output sprocket 784 so that output sprocket 784 is driven whenever main power shaft 718 and the fixed input sprocket 782 are driven.

Figure 7A:
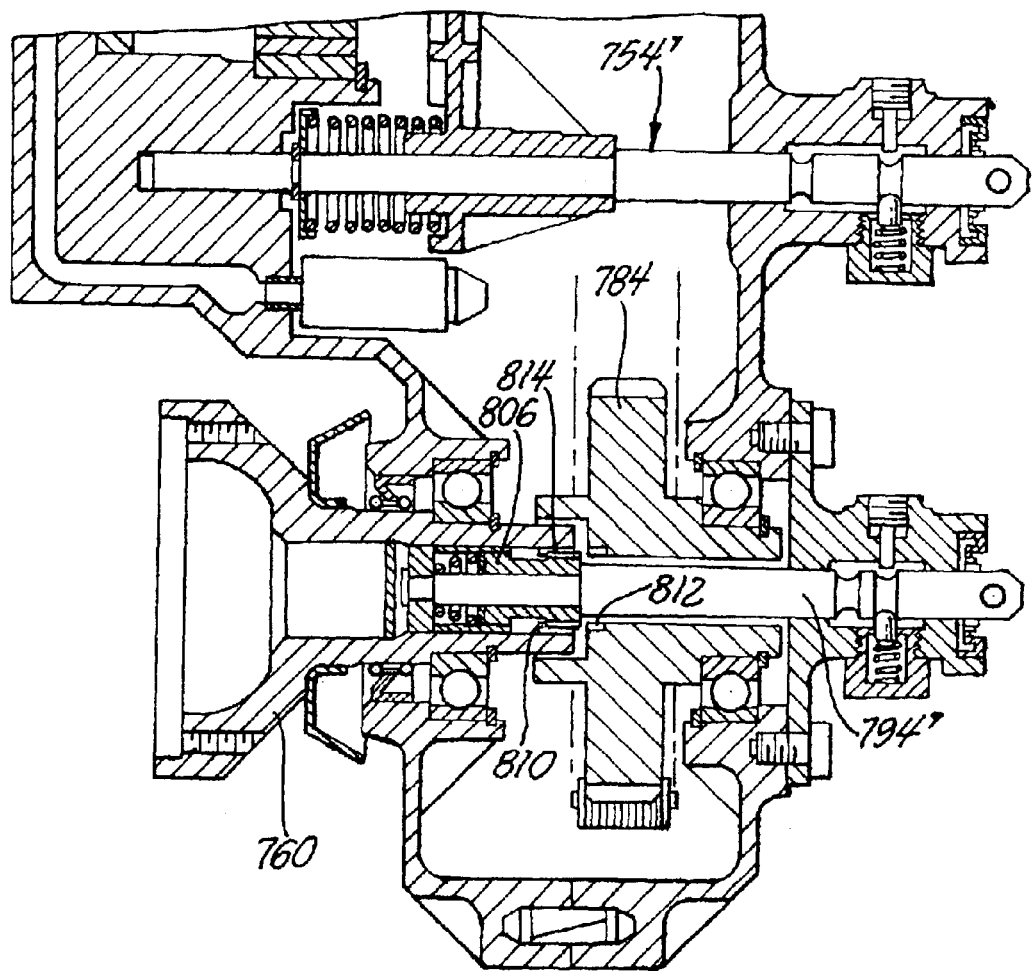
FIG. 7a is a fragmentary longitudinal section of an optional construction for the drive transfer mechanism of the drive transfer case of FIG. 7.

Drive transfer mechanism 780 further includes a clutch unit 788 and an associated solenoid or electromagnetic actuator or solenoid 790 operable to selectively interconnect the main power shaft 718 and auxiliary drive shaft 760. The solenoid 790 is attached by threaded fasteners to housing part 716 and like the other solenoids of this disclosure comprises a selectively energizible coil 792. An elongated shift or control rod 794 of ferrous material has an end portion operatively extending into the core so that it acts as a ferrous core. A coil compression spring 795 is mounted inside coil 792 and operatively behind the end of the shift rod to urge the shift rod 794 axially to the left in FIG. 7 to effect the disengagement of the splined connection between the output sprocket 784 and a clutch collar 806 later described. Shift rod 794 extends from the core end inside coil 792, through bore 796 of output sprocket 784, and into a larger diameter bore 798 of auxiliary drive shaft 760. Control rod 794 has a larger diameter main portion 796 disposed in the bore 796 of the output sprocket 784 and an intermediate diameter portion 799 primarily disposed in the bore 798 of the auxiliary drive shaft and coaxial therewith. A stop shoulder 800 is provided at the junction of the large and intermediate diameter portions of the shift rod. A disc-like spring seat 802 is attached to the small diameter end of shift rod 794 by a snap ring to seat one end of a spring 804 that extends from the fixed seat into engagement with the end of a spool-like clutch collar 806 operatively mounted on the intermediate diameter portion 797 of the shift rod 794. The clutch collar is located in the bore of auxiliary drive shaft 760 and is rotatably mounted on the intermediate portion of the shift rod. The clutch collar is spring biased into engagement with the stop shoulder 800. The clutch collar is operatively moved by rod 794 between an engaged position shown in FIG. 7 and a disengaged position such as shown in FIG. 7a, that discloses a modification of FIG. 7. When in the disengaged position, auxiliary drive shaft 760 is disconnected from output sprocket 784 and is unable to transmit drive torque. Auxiliary drive shaft 760 is selectively connected to output sprocket 784 and driven by main power shaft 718 when clutch collar 806 is moved in the engaged position shown in FIG. 7.

As in the other embodiment and best shown in FIG. 7a, auxiliary drive shaft 760 has internal splines 810 provided in the end of bore 798 is adjacent to output sprocket 784. Output sprocket 784 also has a set of internal splines 812 in the end of bore 798 that is adjacent the inner end of drive shaft 728. Clutch collar 806 has external splines 814 that engage the internal splines 810 of drive shaft 760 and that are also engagable with the internal splines 812 of output sprocket 784.

Clutch collar 806 is shifted by solenoid 790 which is operable to generate an electromagnetic force sufficient to stroke shift rod 794 operatively mounted for rectilinear movement in the housing. This movement is in a direction coaxial to the longitudinal axis 758 of the auxiliary drive shaft 728 in response to the selective energization of the solenoid. Clutch collar 806 operatively mounted on the intermediate diameter end portion 797 of control rod 794 moves in a direction coaxial to the longitudinal axis 758 of the auxiliary drive shaft and in response to movement of control rod 794 to interconnect the auxiliary drive shaft 760 with the output sprocket 784 of the drive transfer mechanism 734.

Transfer case 710 as thus far described operates as follows. For two-wheel drive, the parts of the clutch units are disengaged. In this position, main power shaft 718 typically receives power at input end 720 and drives a first set of vehicle wheels via a propeller shaft that is connected to output end 722. Main power shaft 718 also drives output sprocket 784 via fixed input sprocket 782 and drive belt 786. However, the auxiliary drive shaft 728 is disconnected from output sprocket 784 and consequently, the auxiliary drive shaft 728 is not driven by engine torque. This also applies to the second set of vehicle wheels which are typically driven by auxiliary drive shaft 760.

For four-wheel drive, solenoid 790 is energized to further pull the shift rod 794 into coil 792 against the action of spring 795. This moves shift rod 794 to the right to the position shown in FIG. 7. When shift rod 794 is shifted to the right, spring seat 802 loads coil spring 804 and the force transmitted by this coil spring displaces clutch collar 806 to the right toward the engaged position shown in FIG. 7 in which the clutch collar is in drive engagement with output sprocket 784. In this condition the external splines of clutch collar 806 mesh in an interengaging relationship with the internal splines of the output sprocket 784. To return to two-wheel drive, electromagnetic actuator 740 is de-energized so that spring 795 pushes control rod 797 toward the left. Shoulder 800 of the control rod engages in clutch collar 806 and pushes the clutch collar 758 as the rod strokes to the left thereby disconnecting auxiliary shaft 760 from main power shaft 718.

As pointed out above, transfer case 710 is a two speed transfer case with an input power shaft section 720 that is drivingly connected to an output power shaft section 722 via planetary gear set 732 and the associated speed shift collar 734 to provide two speed drive. More specifically, input power shaft section 720 drives primary output shaft section 722 directly via speed shift collar 734 when speed shift collar 734 is in the position shown in FIG. 7 for high speed operation.

When speed shift collar 734 is shifted to the right to the FIG. 7 position, input power shaft 720 drives sun gear 733 which is drivingly connected thereto it by mating splines. Sun gear 733 meshes with planet gears 738 which in turn mesh with ring gear 744. Planet gears 738 are rotatably mounted on shafts extending from the rotatable planet gear carrier 744 while ring gear 744 is fixed against rotation in housing 712. Consequently sun gear 733 drives planet gear carrier 744 at a reduced speed. Planet gear carrier 744 in turn drives output power shaft 722 via speed shift collar 734 at a reduced input/output speed ratio.

The modification of FIG. 7a is substantially the same as the embodiment of FIG. 7 except that mechanically operated clutch shift rods such as 750' and 794' are employed instead of electromagnetically operated rods 750 and 790.

From the above description and drawing it will be understood that the new and improved clutch unit of this invention augments transfer case design and utility by providing improved packaging of single or two speed drives from a single transmission input, an improved towing package as well as an addition output for an accessory drive.

Moreover, while preferred embodiments of the present invention have been disclosed, various changes and modifications may be made thereto by one skilled in the art without departing from the scope and spirit of the invention as set forth in the appended claims. It is also understood that the terms used herein are merely descriptive, rather than limiting, and that various changes may be made without departing from the scope and spirit of the invention.

I claim:

1. A drive torque transfer case for an automotive vehicle having discrete front and rear sets of traction wheels for vehicle propulsion comprising a housing, a power shaft member operatively mounted in said housing for rotation about a first rotational axis and providing an input and a first output for driving a first of said sets of traction wheels, a second drive shaft member mounted for selective rotation about a second rotational axis and providing a second output for driving a second of said sets of traction wheels, a clutching unit operatively mounted within said second drive shaft member for selectively connecting and disconnecting said second drive shaft member with respect to said first drive shaft member, and a shifter rod member operatively extending within said second drive shaft member for displacing said clutching unit, said clutching unit being mounted for reciprocal movement along said second axis between a first position in which said second drive shaft member is drivingly connected to said first drive shaft member for the selective drive of said second set of traction wheels and a second position in which said second drive shaft member is disconnected from said first drive shaft member so that only said first set of traction wheels is operative to propel said vehicle.

2. A transfer case for an automotive vehicle for selectively routing drive torque from a vehicle engine through a plurality of power paths from a single torque-transmitting input about a first axis to a plurality of separate outputs including first and second outputs for respectively driving first and second discrete sets of vehicle drive wheels comprising a housing, a first drive shaft member mounted in said housing for rotation about the first axis and for transmitting drive torque in the first of said power paths from said input to a first set of said drive wheels, a second drive shaft member operatively mounted in said housing for rotation about a second axis for transmitting drive torque in the second of said power paths to a second set of said drive wheels, a drive transfer mechanism selectively connecting and disconnecting said first drive shaft member with respect to said second drive shaft member, said drive transfer mechanism incorporating a selectively engagable clutching unit, said clutch unit having an axially movable clutching member operatively disposed in a bore of said second drive shaft member and selectively movable from a first position to a second position to drivingly connect said first drive shaft member to said second drive shaft member so that power is routed from said first power path into said second power path to effect the drive of said second set of drive wheels and being further selectively movable from said second position back to said first position to thereby interrupt the routing of torque in said second power path while drive torque is still routed in said first power path for the continued drive of said first set of drive wheels.

3. A transfer case for an automotive vehicle for selectively routing drive torque from a vehicle engine through a plurality of power paths from a single torque-transmitting input to a plurality of separate outputs including first and second outputs for respectively driving first and second discrete sets of vehicle drive wheels comprising a housing, a first drive shaft member mounted in said housing for rotation about a first axis and for transmitting drive torque in the first of said power paths from said input to a first set of said drive wheels, a second drive shaft member operatively mounted in said housing for rotation about a second axis for transmitting drive torque in the second of said power paths to a second set of said drive wheels, a drive transfer mechanism selectively connecting and disconnecting said first drive shaft with respect to said second drive shaft, said drive transfer mechanism incorporating a selectively engagable clutching unit, said clutch unit having an axially movable clutching member operatively disposed in a bore of said second drive shaft member and selectively movable from a first position to a second position to drivingly connect said first drive shaft member to said second drive shaft member so that power is routed from said first power path into said second power path to effect the drive of said second set of drive wheels and being further selectively movable from said second position back to said first position to thereby interrupt the routing of torque in said second power path while drive torque is still routed in said first power path for the continued drive of said first set of drive wheels, said drive transfer mechanism including a transfer gear element rotatably mounted in said housing for receiving drive torque from said first power path, said transfer gear element having an annular internal arrangement of drive splines thereon and said clutching member being a shiftable annular spool element having drive splines externally formed thereon and an axially movable shifter rod operatively supporting the spool element for operatively shifting the spool element within the second drive shaft member between a first predetermined position in which said splines drivingly mesh with the splines on said transfer gear element to effect the drive of said second drive shaft member and a second position so that said splines disengage from said splines on said transfer gear to effect the interruption of the drive of said second drive shaft member.

4. The transfer case of claim 3 wherein said separate outputs further include a third output for driving a rotatable accessory and wherein said transfer case has a third drive shaft member operatively mounted therein for rotation about a third axis for transmitting torque to said accessory, a second drive transfer mechanism selectively connecting and disconnecting said first drive shaft with respect to said third drive shaft, said second drive transfer mechanism incorporating a second selectively engagable clutching unit, said second clutch unit having an axially movable clutching member operatively disposed in a bore of said third drive shaft member and selectively movable from a first position to a second position to drivingly connect said first drive shaft member to said third drive shaft member so that power is routed from said first power path into said third power path to effect the drive of said accessory and being further selectively movable from said second position back to said first position to thereby interrupt the routing of torque in said third power path while drive torque is still routed in said first power path for the continued drive of said first set of drive wheels.

5. The transfer case of claim 3, wherein the first drive shaft member comprises input and output drive shaft sections, and wherein a planetary gear unit is operatively interposed between the input and output drive shaft sections for providing a direct drive and for providing a speed reducing and torque increasing drive.

6. The transfer case of claim 3 wherein the first drive shaft member comprises input and output drive shaft sections, and wherein the first drive shaft transfer mechanism selectively connects and disconnects the input drive shaft section of the first drive shaft member with the second drive shaft member and wherein, a second drive shaft transfer mechanism selectively connects and disconnects the input drive shaft section with the output drive shaft section, the second drive shaft transfer mechanism having a second clutching member operatively disposed in a bore of the output drive shaft section and movable between first and second positions relative to the output drive shaft section for connecting and disconnecting said output drive shaft section with respect to the input drive shaft section for interrupting the transmission of torque through the transfer case to said first set of drive wheels so that the vehicle can be towed while all wheels are on the road way and without backdrive through the transfer case when the clutching member and the second clutching member are in their respective second positions interrupting the transmission of torque through the transfer case to the first and second sets of drive wheels.

7. The transfer case of claim 6 wherein the input drive shaft section has a pair of drive sprockets operatively mounted thereon and wherein the output drive shaft section and the second drive shaft member have separate driven sprockets that are provided with internal drive splines and first and second drive belts for respectively interconnecting the pair of drive sprockets with the driven sprockets, and wherein the first and second clutching members are annular clutch collars each having external drive splines thereon for the selective meshing engagement with the internal drive splines in the driven sprockets for the selective drives of the output drive shaft section and the second drive shaft member.

8. A transfer case for an automotive vehicle for selectively routing drive torque from a vehicle engine through a plurality of power paths from a single torque-transmitting input to a plurality of separate outputs including first and second outputs for respectively driving first and second discrete sets of vehicle drive wheels comprising a housing, a first drive shaft member mounted in said housing for rotation about a first axis and for transmitting drive torque in the first of said power paths from said input to a first set of said drive wheels, a second drive shaft member operatively mounted in said housing for rotation about a second axis for transmitting drive torque in the second of said power paths to a second set of said drive wheels, a drive transfer mechanism selectively connecting and disconnecting said first drive shaft with respect to said second drive shaft, said drive transfer mechanism incorporating a selectively engagable clutching unit, said clutch unit having an axially movable clutching member operatively disposed in a bore of said second drive shaft member and selectively movable from a first position to a second position to drivingly connect said first drive shaft member to said second drive shaft member so that power is routed from said first power path into said second power path to effect the drive of said second set of drive wheels and being further selectively movable from said second position back to said first position to thereby interrupt the routing of torque in said second power path while drive torque is still routed in said first power path for the continued drive of said first set of drive wheels, said drive transfer mechanism further incorporating a torque transfer member that forms part of said second power path and having internal drive splines rotatably mounted in said housing adjacent to said second drive shaft member and said clutching member comprising a shiftable cylindrical body element having having an annular arrangement of radially extending splines thereon, an axially movable shift rod operatively mounted in said housing and having said body element operatively affixed thereon, said rod and said body element being movable between said first position in which said splines drivingly mesh with the splines of said torque transfer member to effect the drive of said second shaft and the drive of a second pair of vehicle propulsion wheels and a second position in which said splines are moved from engagement with the splines of said torque transfer member to interrupt the drive of said second shaft and the drive of said second set of vehicle propulsion wheels.

9. The transfer case of claim 8 wherein an electrically energizable solenoid is operatively mounted on said housing and wherein said shift rod is an elongated shaft of ferrous material, said shift rod having an end portion operatively extending into said solenoid, said solenoid being selectively energizable to produce a magnetic field to stroke said shift rod from said second to said first position, and a spring mechanism to stroke said shift rod from said second to said first position in response to the deenergization of said solenoid.

10. The transfer case of claim 8 wherein said separate outputs further include a third output for driving a rotatable accessory and wherein said transfer case has a third drive shaft member operatively mounted therein for rotation about a third axis for transmitting torque to said accessory, a second drive transfer mechanism selectively connecting and disconnecting said first drive shaft with respect to said third drive shaft, said second drive transfer mechanism incorporating a second selectively engagable clutching unit, said second clutch unit having an axially movable clutching member operatively disposed in a bore of said third drive shaft member and selectively movable from a first position to a second position to drivingly connect said first drive shaft member to said third drive shaft member so that power is routed from said first power path into said third power path to effect the drive of said accessory and being further selectively movable from said second position back to said first position to thereby interrupt the routing of torque in said third power path while drive torque is still routed in said first power path for the continued drive of said first set of drive wheels.

11. The transfer case of claim 8, wherein said first drive set shaft member comprises input and output drive shaft sections, and wherein a planetary gear unit is operatively interposed between the input and output drive shaft sections for providing a direct drive and for providing a speed reducing and torque increasing drive.

12. The transfer case of claim 8 wherein the first drive shaft member comprises input and output drive shaft sections, and the first drive shaft transfer mechanism selectively connects and disconnects the input drive shaft section of the first drive shaft member with the second drive shaft member and wherein a second drive shaft transfer mechanism selectively connects and disconnects the input drive shaft section with the output drive shaft section, the second drive shaft transfer mechanism having a second clutching member operatively disposed in a bore of the output drive shaft section and movable between first and second positions relative to the output drive shaft section for connecting and disconnecting said output drive shaft section with respect to the input drive shaft section for interrupting the transmission of torque through the transfer case to said first set of drive wheels so that the vehicle can be towed while all wheels are on the road way and without backdrive through the transfer case when the clutching member and the second clutching member are in their respective second positions interrupting the transmission of torque through the transfer case to the first and second sets of drive wheels.

13. The transfer case of claim 12 wherein the input drive shaft section has a pair of drive sprockets operatively mounted thereon and wherein the output drive shaft section and the second drive shaft member have separate driven sprockets that are provided with internal drive splines and first and second drive belts for respectively interconnecting the pair of drive sprockets with the driven sprockets, and wherein the first and second clutching members are annular clutch collars each having external drive splines thereon for the selective meshing engagement with the internal drive splines in the driven sprockets for the selective drives of the output drive shaft second and the section drive shaft member.

* * * * *